(12) United States Patent
Baghsorkhi et al.

(10) Patent No.: US 10,025,570 B2
(45) Date of Patent: Jul. 17, 2018

(54) MODIFYING APPLICATIONS FOR INCREMENTAL CHECKPOINTS

(71) Applicant: INTEL CORPORATION, Santa Clara, CA (US)

(72) Inventors: Sara S. Baghsorkhi, San Jose, CA (US); Christos Margiolas, Santa Claracal, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/278,091

(22) Filed: Sep. 28, 2016

(65) Prior Publication Data

US 2018/0088916 A1    Mar. 29, 2018

(51) Int. Cl.
    *G06F 9/45*  (2006.01)
    *G06F 8/41*  (2018.01)

(52) U.S. Cl.
    CPC .................................. *G06F 8/433* (2013.01)

(58) Field of Classification Search
    CPC ................................................... G06F 8/433
    USPC ................................ 717/150–156, 10–146
    See application file for complete search history.

(56) References Cited

U.S. PATENT DOCUMENTS

| | | | | |
|---|---|---|---|---|
| 5,327,561 A * | 7/1994 | Choi | ....................... | G06F 8/433 717/144 |
| 5,448,737 A * | 9/1995 | Burke | ...................... | G06F 8/433 717/146 |
| 5,493,675 A * | 2/1996 | Faiman, Jr. | ............. | G06F 8/433 717/144 |
| 5,613,117 A * | 3/1997 | Davidson | ................ | G06F 8/433 717/144 |
| 5,659,753 A * | 8/1997 | Murphy | .................. | G06F 8/433 717/143 |
| 5,836,014 A * | 11/1998 | Faiman, Jr. | ............. | G06F 8/433 717/147 |
| 6,128,775 A * | 10/2000 | Chow | ...................... | G06F 8/441 717/156 |

(Continued)

OTHER PUBLICATIONS

Shreedhar et al, "Incremental Computation of Dominator Trees", ACM Transactions on Programming Languages and Systems, vol. 19, No. 2, pp. 239-252, 1997.*

(Continued)

*Primary Examiner* — Anil Khatri
(74) *Attorney, Agent, or Firm* — International IP Law Group, P.L.L.C.

(57) ABSTRACT

In one example, a system for modifying applications to support incremental checkpoints can include logic to generate a dominator tree based on a control flow graph for source code, wherein the control flow graph and the dominator tree comprise a plurality of nodes corresponding to basic blocks of the source code. The processor can select a region based on a leaf node of the dominator tree, the region based on an instruction threshold, and insert a first set of commit instructions into the source code based on entry points into the region and insert a second set of commit instructions into the source code based on exit points from the region. The processor can update the dominator tree to exclude the selected region and compile the source code into an executable application, wherein the first set of commit instructions and the second set of commit instructions enable incremental checkpoints.

18 Claims, 7 Drawing Sheets

(56) References Cited

U.S. PATENT DOCUMENTS

| | | | |
|---|---|---|---|
| 6,263,489 B1 | 7/2001 | Olsen et al. | |
| 6,738,967 B1* | 5/2004 | Radigan | G06F 8/47 717/146 |
| 6,751,792 B1* | 6/2004 | Nair | G06F 8/443 717/140 |
| 7,146,606 B2* | 12/2006 | Mitchell | 717/141 |
| 7,590,521 B2* | 9/2009 | Ma | G06F 11/3676 703/1 |
| 7,861,226 B1* | 12/2010 | Episkopos | G06F 11/3696 717/124 |
| 8,494,832 B2* | 7/2013 | Krishnan | G06F 11/3696 703/22 |
| 8,527,920 B1* | 9/2013 | Choudhury | G06F 17/505 716/104 |
| 8,731,863 B2* | 5/2014 | Mishima | G16H 40/63 702/127 |
| 8,762,970 B2* | 6/2014 | Kawahito | G06F 8/40 717/104 |
| 9,081,928 B2* | 7/2015 | Van Eijndhoven | G06F 8/456 |
| 9,176,842 B2* | 11/2015 | Chen | G06F 11/3466 |
| 2005/0229165 A1 | 10/2005 | Ma et al. | |
| 2006/0156156 A1 | 7/2006 | Elnozahy | |
| 2015/0040105 A1 | 2/2015 | Abadi et al. | |
| 2016/0055345 A1 | 2/2016 | Livshits et al. | |

OTHER PUBLICATIONS

Georgiadis et al, "Dominator Tree Verification and Vertex-Disjoint Paths", ACM, pp. 433-442, 2005.*

Smits et al, "FlowSpec: Declarative Dataflow Analysis Specification", ACM, pp. 221-231, 2017.*

Tan et al, "CFG Construction Soundness in Control-Flow Integrity", ACM, pp. 3-13, 20017.*

Abadi et al, "Control-Flow Integrity Principles, Implementations, and Applications", ACM, pp. 340-353, 2005.*

Cytron et al, "Efficiently Computing Static Single Assignment Form and the Control Dependence Graph", ACM Transact~ons on Programmmg Languages and Systems, vol. 13, No. 4, pp. 451-490, 1991.*

Rahmouni et al, "Formulation and Evaluation of Scheduling Techniques for Control Flow Graphs", IEEE, pp. 386-391, 1995.*

Jaffar et al, "A Path-Sensitively Sliced Control Flow Graph", ACM, pp. 133-143, 2014.*

PCT International Search Report, PCT Application No. PCT/US2017/047287, date of completion Nov. 24, 2017, 3 pages.

* cited by examiner

US 10,025,570 B2

MODIFYING APPLICATIONS FOR INCREMENTAL CHECKPOINTS

TECHNICAL FIELD

This disclosure relates generally to modifying applications, but not exclusively, to modifying applications to support incremental checkpoints.

BACKGROUND

Software applications continue to grow in complexity, which increases the number of executed instructions. Accordingly, software applications can use an increasing amount of power, which can drain the batteries of mobile devices. Therefore, mobile devices can lose power and a current state of a software application can be lost. For example, ultra-low power mobile devices that rely on energy harvesting may frequently lose power. In some examples, non-mobile devices can also lose power for a variety of reasons, which results in a loss of data executed by a software application.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
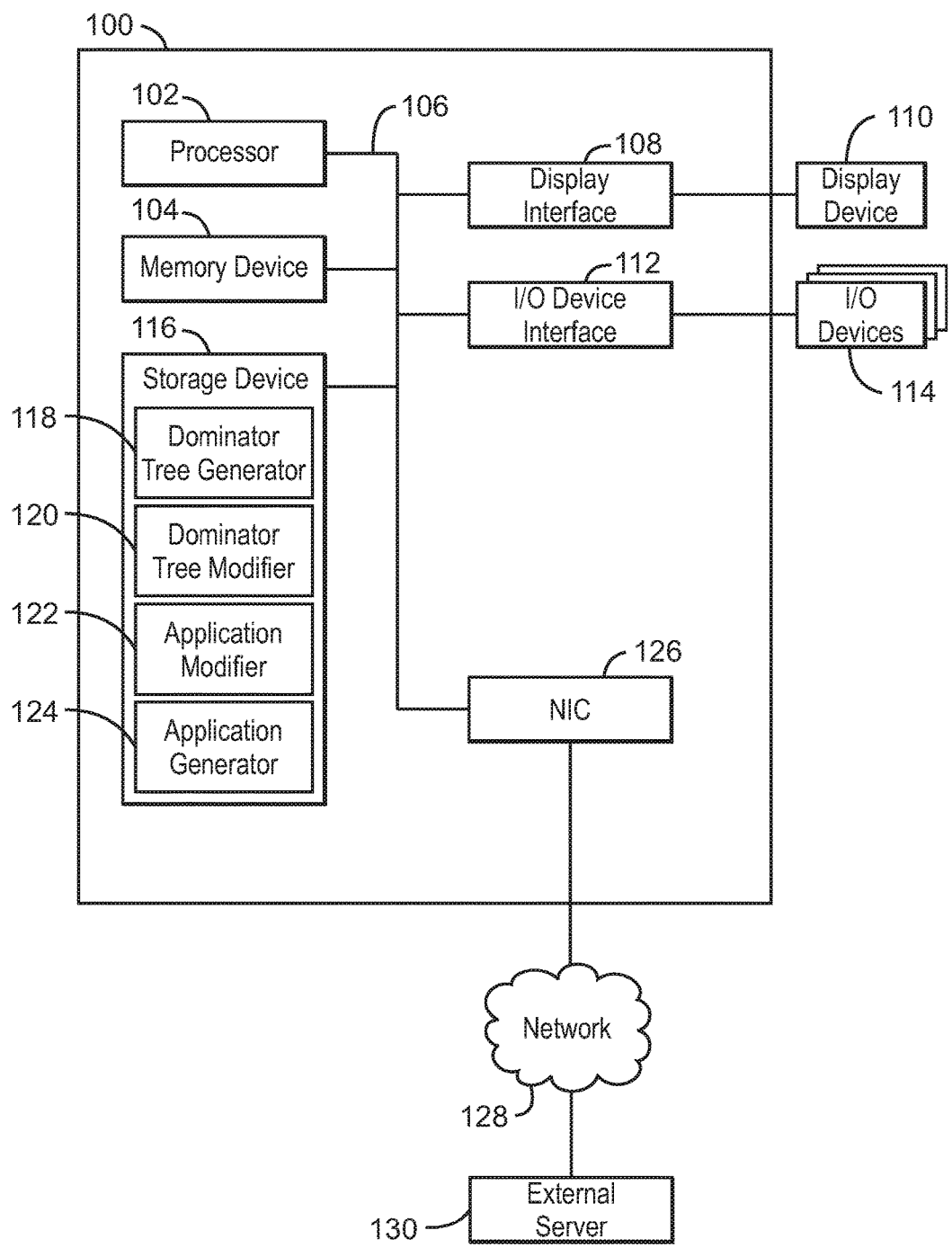
FIG. 1 illustrates a block diagram of a computing device that can modify applications to support incremental checkpoints.

As discussed above, computing devices can lose power for various reasons, which results in a loss of the state of any software being executed. Thus, inserting incremental checkpoints to store state information for software can minimize the amount of lost data and guarantee forward progress. Checkpointing is a technique for rollback recovery in systems requiring resiliency, and is implemented as either a full checkpointing scheme or an incremental scheme. Full checkpointing saves the entire active state of a program, while incremental checkpointing saves the difference between the current state and a previous program state using techniques such as a copy on write backup mechanism. Incremental checkpointing can result in lower overhead for systems with a large active memory state such as systems equipped with non-volatile random access memory (NVRAM). Additionally, incremental checkpointing can improve the performance for low power embedded systems where computation and resiliency mechanisms are optimized for power.

Currently, checkpoint region boundaries are either determined dynamically at runtime or the user is required to identify the checkpoint region boundaries manually. Manually identifying checkpoint region boundaries is error prone and cumbersome. Furthermore, dynamically determining checkpoint region boundaries incurs runtime overhead and prevents a compiler from performing any log elimination or optimizations.

Techniques described herein systematically modify applications by partitioning the applications into transaction or checkpoint regions. In some examples, a system can generate a dominator tree based on a control flow graph for source code, wherein the control flow graph and the dominator tree comprise a plurality of nodes corresponding to basic blocks of the source code. A control flow graph, as referred to herein, includes any suitable number of nodes corresponding to instructions that can be traversed during execution of an application. A dominator tree, as referred to herein, is a graph in which each node D dominates child nodes if every path from the entry node to the child nodes of D must go through D. In some examples, a system generates a control flow graph based on source code for an application and generates a dominator tree based on the control flow graph.

In some embodiments, techniques described herein include identifying regions within the dominator tree and inserting commit instructions into source code of an application based on entry points and exit points corresponding to the identified regions. A commit instruction, as referred to herein, can include any suitable number of functions and instructions that enable an application to save a current state of execution. In some embodiments, commit instructions serve as checkpoints that are inserted into an application. For example, a commit instruction can store variable values, the heap, the stack, and any other state information in non-volatile memory. Techniques for identifying a region of a dominator tree are described in detail below in relation to FIG. 3.

In some embodiments, a system can update the dominator tree to exclude the selected region in response to inserting the commit instructions. In some embodiments, a system described herein can compile the source code into an executable application, wherein commit instructions enable incremental checkpoints. For example, modified source code that includes commit instructions can prevent the application from losing data during execution. In some examples, if the application is executed on a mobile device that loses battery power or a non-mobile device that restarts unexpectedly, the application can revert to the last stored state from the last commit instruction. Accordingly, techniques described herein can prevent the loss of data generated by an application during execution.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

FIG. 1 is a block diagram of an example of a computing device that can modify applications to support incremental checkpoints. The computing device 100 may be, for example, a low power microcontroller, a mobile phone, laptop computer, desktop computer, or tablet computer, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can modify applications to support incremental checkpoints.

The processor 102 may also be linked through the system interconnect 106 (e.g., PCI®, PCI-Express®, NuBus, etc.) to a display interface 108 adapted to connect the computing device 100 to a display device 110. The display device 110 may include a display screen that is a built-in component of the computing device 100. The display device 110 may also include a computer monitor, television, or projector, among others, that is externally connected to the computing device 100. The display device 110 can include light emitting diodes (LEDs), and micro-LEDs, among others.

The processor 102 may be connected through a system interconnect 106 to an input/output (I/O) device interface 112 adapted to connect the computing device 100 to one or more I/O devices 114. The I/O devices 114 may include, for example, a keyboard and a pointing device, wherein the pointing device may include a touchpad or a touchscreen, among others. The I/O devices 114 may be built-in components of the computing device 100, or may be devices that are externally connected to the computing device 100.

In some embodiments, the processor 102 may also be linked through the system interconnect 106 to a storage device 116 that can include a hard drive, an optical drive, a USB flash drive, an array of drives, or any combinations thereof. In some embodiments, the storage device 116 can include any suitable applications. In some embodiments, the storage device 116 can include a dominator tree generator 118 that can generate a dominator tree based on a control flow graph for source code, wherein the control flow graph and the dominator tree comprise a plurality of nodes corresponding to basic blocks of the source code. A basic block, as referred to herein, can include instructions that have one entry point and one exit point. As discussed above, the dominator tree can be organized such that each node dominates each child node. Dominating, as referred to herein, indicates that each path in the dominator tree from the entry node or head node to a child node must traverse the parent node.

In some embodiments, the storage device 116 can also include a dominator tree modifier 120 that can select a region based on a leaf node of the dominator tree, wherein the region is based on for example an instruction threshold, or any other suitable threshold. In some examples, the dominator tree modifier 120 can select the deepest left most leaf in the dominator tree. The dominator tree modifier 120 can then determine if a combination of any ancestor nodes for the selected leaf node and the leaf nodes dominated by that ancestor is below a threshold value. For example, a cost or weight can be assigned to each node based on a number of instructions included in each node, a complexity of the instructions based on a number of loops, and the like. The dominator tree modifier 120 can continue traversing the dominator tree from the leaf node through parent nodes towards the entry node in order to identify a region with the most nodes that are below the threshold value. Identifying a region is described in greater detail below in relation to FIGS. 2-6.

In some embodiments, an application modifier 122 can insert a first commit instruction into the source code based on an entry point into the region and insert a second commit instruction into the source code based on an exit point from the region In some embodiments, a region may have more than one exit point and more than one entry point based on the control flow graph, which can result in inserting more than one commit instruction for entry into the region and more than one commit instruction for exiting the region. As discussed above, the first commit instruction and the second commit instruction can store state information for the application to non-volatile memory. Accordingly, the application modifier 122 can store state information prior to executing instructions in the identified region of the dominator tree and following the execution of the instructions in the identified region.

In some embodiments, the dominator tree modifier 120 can update the dominator tree to exclude the selected region. For example, the dominator tree modifier 120 can exclude the newly formed region and use the updated dominator tree to identify and form any additional regions. In some examples, the dominator tree modifier 120 can separate each node of the dominator tree into an identified region, as discussed in greater detail below.

In some embodiments, an application generator 124 can compile the source code into an executable application, wherein commit instructions inserted at entry points into regions and commit instructions inserted at exit points from regions enable incremental checkpoints. For example, the application generator 124 can generate an executable instruction that saves state information during execution of the application before executing instructions for each identified region and following the execution of each identified region. Accordingly, the executable application can minimize the amount of data lost when the application loses power or is unexpectedly terminated. Moreover, in some examples, a compiler can include the dominator tree generator 118, dominator tree modifier 120, application modifier 122, and application generator 124.

In addition, a network interface controller (also referred to herein as a NIC) 126 may be adapted to connect the computing device 100 through the system interconnect 106 to a network 128. The network 128 may be a cellular network, a radio network, a wide area network (WAN), a local area network (LAN), or the Internet, among others. The network 128 can enable data to be transmitted between the computing device 100 and an external server 130. In some embodiments, the external server 130 can provide a service for the computing device 100. For example, the computing device 100 can transmit source code for an application and a request to generate a modified executable form of the application that includes commit instructions based on techniques described herein. The external server 130 can detect the request to generate a modified application and return the modified application that includes commit instructions to the computing device 100. Therefore, the external server 132 can remotely perform the actions of the dominator tree generator 118, dominator tree modifier 120, application modifier 122, and application generator 124 as a remote service. In some embodiments, the computing device 100 can receive source code for an application from the external server 130 and the computing device can return a modified application to the external server 130 that includes commit instructions and incremental checkpoints.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the functionalities of the dominator tree generator 118, dominator tree modifier 120, application modifier 122, and application generator 124 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the dominator tree generator 118, dominator tree modifier 120, application modifier 122, and application generator 124 can be implemented with logic, wherein the logic, as referred to herein, can include any suitable hardware (e.g., a processor, among others), software (e.g., an application, among others), firmware, or any suitable combination of hardware, software, and firmware.

Figure 2:
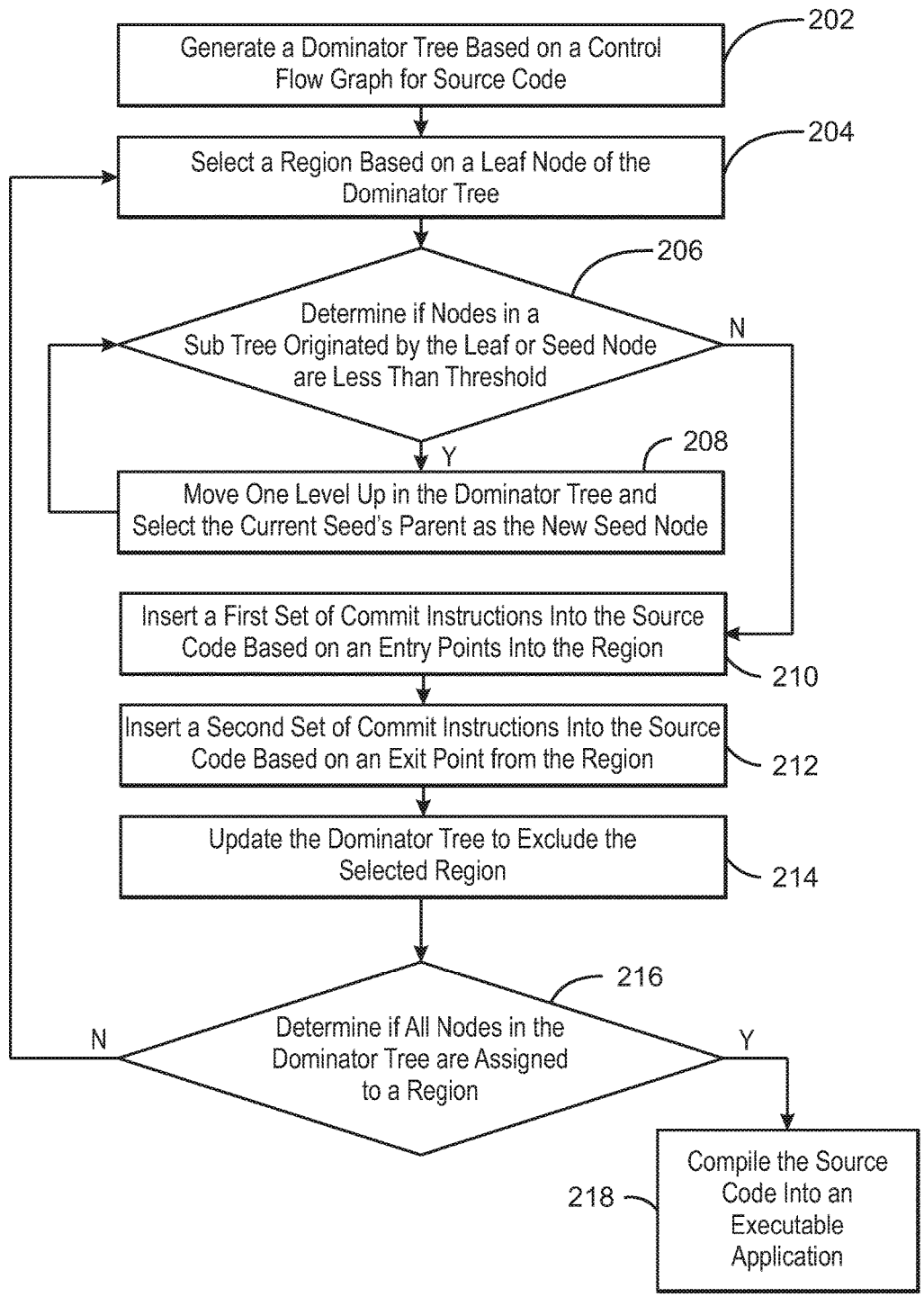
FIG. 2 is an example process flow diagram for modifying applications to support incremental checkpoints.

FIG. 2 is an example process flow diagram for modifying applications to support incremental checkpoints. The method 200 can be implemented with any suitable computing device such as computing device 100 of FIG. 1, among others.

At block 202, the dominator tree generator 118 can generate a dominator tree based on a control flow graph for source code, wherein the control flow graph and the dominator tree comprise a plurality of nodes corresponding to basic blocks of the source code. The control flow graph can indicate a control flow of instructions or basic blocks for an application. A basic block can include instructions that have one entry point and one exit point. As discussed above, the dominator tree can be based on the control flow graph such that the dominator tree includes a same number of nodes as the control flow graph. The dominator tree can be organized such that each node dominates each child node. The dominator tree is discussed in greater detail below in relation to FIGS. 3-6.

At block 204, the dominator tree modifier 120 can select a region based on a leaf node of the dominator tree, wherein the region is based on an instruction threshold. The dominator tree modifier 120 can then determine if a combined weight or cost of a selected leaf node or the child nodes dominated by a current seed node is below a threshold value at block 206. For example, a cost or weight can be assigned to each node based on a number of instructions included in each node, a complexity of the instructions based on a number of loops, and the like. In some embodiments, the dominator tree modifier 120 can determine if nodes in a sub tree originated by the leaf node or a seed node have a cost or weight below a threshold. A sub tree, as referred to herein, can include any number of nodes that depend from a seed node. A seed node, as referred to herein, includes a node which is being analyzed to determine if the sub tree of the node is below a threshold value. If the dominator tree modifier 120 determines that the cost or weight of a sub tree originated by the leaf node or seed node is below a threshold value, the process continues at block 208. If the dominator tree modifier 120 determines that the cost or weight of a sub tree originated by the leaf node or seed node is not below a threshold value, the process continues at block 210.

At block 208, the dominator tree modifier 120 can move up one level in the dominator tree and select the current seed node's parent as the new seed node. Moving up one level in the dominator tree enables the dominator tree modifier 120 to identify a seed node with the most nodes in a sub tree that are below the threshold value. Identifying a region is discussed in greater detail below in relation to FIG. 3.

At block 210, the application modifier 122 can insert a first set of commit instructions into the source code based on entry points into the region. A commit instruction, as discussed above, can save the state information for an application such as variable values, register values, stack information, and heap information, among others. In some embodiments, the commit instructions can be used in conjunction with auxiliary data structures, such as redo logs and undo logs, to enable transactional execution. A redo log can enable any changes to data following a previous commit instruction to be generated or committed. An undo log can enable changes to data following the previous commit instruction to be uncommitted. The commit instructions can enable execution of an application to resume at a stored execution point if the runtime environment of the application is interrupted. At block 212, the application modifier 122 can insert a second set of commit instructions into the source code based on exit points from the region.

At block 214, the dominator tree modifier 120 can update the dominator tree to exclude the selected region. For example, the dominator tree modifier 120 can detect any changes to dominance of nodes in a dominator tree after excluding the nodes of the previously identifier region. The dominator tree modifier 120 can update the dominator tree to reflect the changes in dominance of the nodes. In some embodiments, the dominator tree modifier 120 can also split any nodes that include function calls. For example, the dominator tree modifier 120 can split a node with a function call into a node including instructions before a function call, a node that includes the function call, and a node with instructions following the function call. Splitting nodes based on function calls is described in greater detail below in relation to FIG. 5.

At block 216, the dominator tree modifier 120 can determine if all of the nodes of the dominator tree are assigned to a region. For example, the dominator tree modifier 120 can determine if there are additional regions to be identified. If there are nodes in the dominator tree that are not assigned to a region, the process returns to block 204. If all of the nodes of the dominator tree are assigned to a region, the process continues to block 218.

At block 218, the application generator 124 can compile the source code into an executable application, wherein the first commit instructions and the second commit instructions enable incremental checkpoints. In some embodiments, the application generator 124 can perform optimizations based on the identified region of the dominator tree. For example, the application generator 124 can perform redundant log elimination. For example, undo/redo log insertion for scalar values updated multiple times within a region can be hoisted up/pushed down to the region boundaries. Furthermore, consecutive accesses within a region can be combined/coalesced into a larger redo/undo log instance. In some embodiments, the commit instructions inserted into the executable application can implement a snapshot copy on write technique. For example, the executable application may keep variable values and other state information in volatile memory and write any modifications to the variable values and state information to non-volatile memory with commit instructions. In some embodiments, the executable application can be executed in an energy harvesting environment in which a wearable device or a computing device that is solar powered can lose power and return to a previously committed state when power is resumed to the device.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
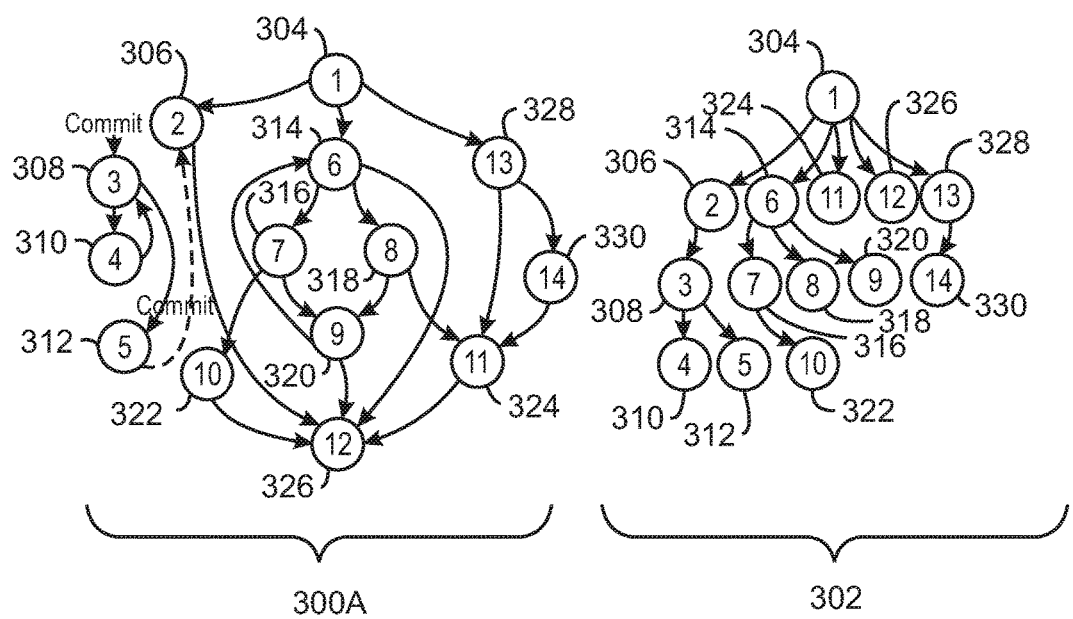
FIG. 3 is an example block diagram for identifying a region in the dominator tree.

FIG. 3 is an example block diagram for identifying a region in the dominator tree. FIG. 3 illustrates a control flow graph 300A and a dominator tree 302. Identifying a region can be implemented with any suitable computing device such as the computing device 100 of FIG. 1.

The control flow graph 300A represents control paths for executing instructions for an application with fourteen basic blocks corresponding to each node of the control flow graph 300A. For example, the control flow graph includes node 1 304, node 2 306, node 3, 308, node 4 310, node 5 312, node 6 314, node 7 316, node 8 318, node 9 320, node 10 322, node 11 324, node 12 326, node 13 328, and node 14 330. The arrows, also referred to as arcs, between node 1 304-node 14 330 can represent conditional or fall through jumps between the nodes. In some embodiments, the dominator tree 302 rearranges node 1 304-node 14 330 of the control flow graph based on dominance. As discussed above, the dominator tree 304 indicates that each parent node is dominant over children nodes. That is, each control path from the entry node to the children nodes includes the parent nodes. For example, node 3 308 is dominant over node 4 310 and node 5 312 because each control path in the control flow diagram from node 1 304 to node 4 310 and node 5 312 includes node 3 308.

In some embodiments, to identify regions between commit instructions (also referred to herein as checkpoints), the dominator tree modifier 120 can traverse a dominator tree for an application from the bottom or deepest node to the entry node. Accordingly, the dominator tree modifier 120 can start traversing a dominator tree with the deepest leaf node not assigned to any region yet. In some examples, the dominator tree is traversed starting with the deepest left most leaf node. For example, the dominator tree modifier 120 can begin traversing the dominator tree 304 with node 4 310, which is set as a region formation seed node. A region formed via a seed node is composed of the node itself and all its children nodes in the dominator tree that are not part of any previously formed region.

In some embodiments, to form regions of a certain granularity, the dominator tree modifier 120 can identify a region based on a threshold value such as a maximum instruction count, among others. For example, the dominator tree modifier 120 can traverse up the dominator tree 302 until the dominator tree modifier 120 finds an ancestor node that forms the largest region with a cost still within the threshold value. If such an ancestor node exists, the ancestor node is set as the new region formation seed. For example, in FIG. 3, the dominator tree modifier 120 can determine that the weight assigned to node 4 310 is less than the threshold value. However, the dominator tree modifier 120 can also determine that moving one level up in the dominator tree 304, a larger region can be formed with node 3 308 as the root. This region will include node 3 308, node 4 310, and node 5 312. The dominator tree modifier 120 can compute a cost of a region from a new seed node, wherein the cost incorporates an aggregated number of instructions of the nodes of a region, an aggregated loop count, an average trip count of loops, or bias of branches nested within the region into basic block weights. In FIG. 3, a region cost exceeds the threshold if the dominator tree modifier 120 moves one more level up to node 2 306. Therefore, the dominator tree modifier 120 can set node 3 308 as the region formation seed. In some embodiments, if the cost of a single node is higher than threshold during the bottom up traversal of the dominator tree, the node can be separated into multiple nodes. Commit instructions can be inserted before node 3 308 and following node 5 312. In some embodiments, since the control flow graphs are based on instructions of an application, Inserting commit instructions into a control flow graph can also include inserting commit instructions into source code of an application. Commit instructions are described in greater detail below.

The control flow graph 300A and dominator tree 302 of FIG. 3 are not intended to indicate that there are a particular number of nodes, arcs, or commit instructions to be included. Rather, the control flow graph 300A and the dominator tree 302 can include any suitable number of nodes, arc, and commit instructions, among others.

Figure 4:
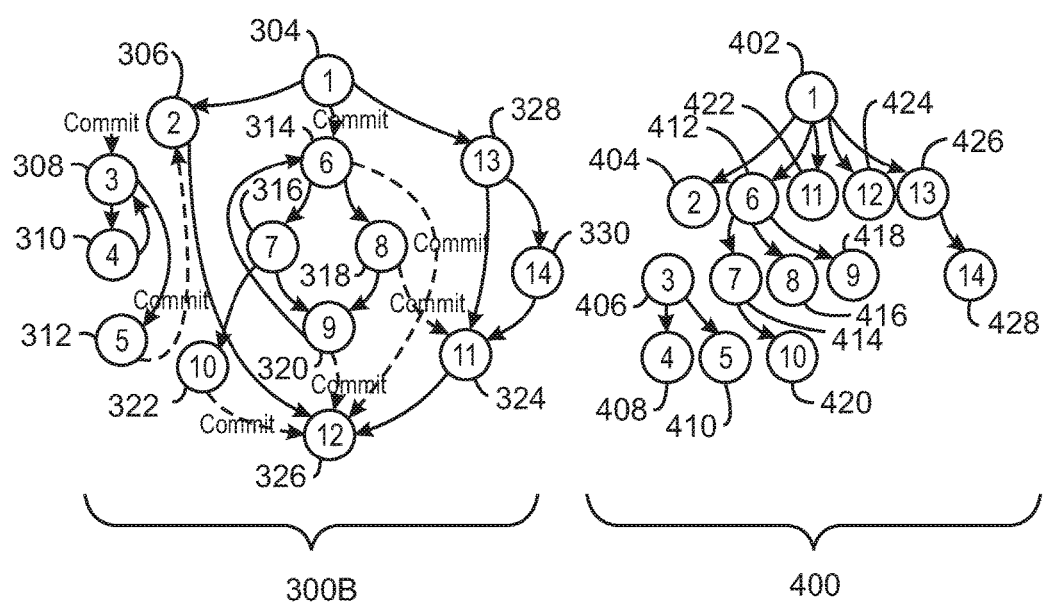
FIG. 4 is an example block diagram for inserting commit instructions.

FIG. 4 is an example block diagram for inserting commit instructions. Inserting commit instructions can be performed by any suitable computing device such as the computing device 100 of FIG. 1. The control flow graph 300B of FIG. 4 includes node 1 304-node 14 330 of control flow graph 300A. However, control flow graph 300B can include additional commit instructions inserted between nodes. The dominator tree 400 can represent an updated dominator tree in which node 3 406, node 4 408, and node 5 410 are excluded from dominator tree 400.

In some embodiments, an application modifier 122 can insert commit instructions when the dominator tree modifier 120 has identified a region or region formation seed. In some examples, the commit instructions can be inserted on arcs exiting the identified region. An arc can include any conditional or fall through jump in execution of an application. For example, the application modifier 122 can insert commit instructions on the arcs that correspond to dominance frontier basic blocks or nodes of the region formation seed. A dominance frontier of a node d, as referred to herein, is the set of all nodes n such that d dominates an immediate predecessor of n, but d does not strictly dominate n. The dominance frontier includes the set of nodes where node d's dominance stops. The commit instructions can mark the end of the formed region. For example, the application modifier 122 can insert commit instructions along an arc from node 5 312 to node 2 306 in the modified control flow graph 300B of FIG. 4. Furthermore, the application modifier 122 can insert commit instructions on each incoming arc in the control flow graph to the seed node. For example, the application modifier 122 can insert commit instructions at the beginning of the region formed by the seed node, which is between node 2 306 an node 3 308 in the control flow graph 300B.

In some embodiments, the commit instructions can be included in their own basic blocks during code generation. However, with respect to region formation analysis, the commit instructions may not be included in additional iterations for identifying regions in the dominator tree 302. For example, the dominator tree modifier 120 can exclude node 3 406, node 4 408, and node 5 410 on the second iteration of the dominator tree 400 that includes node 1 402 through node 14 428. Therefore, the dominator tree modifier 120 can select node 10 420 as the deepest leaf node and traverse up the dominator tree 400 to identify a region that includes nodes with a cost or weight below a threshold value. In the example of FIG. 4, the dominator tree modifier 400 determines that node 6 412, node 7 414, node 8 416, node 9 418, and node 10 420 are to be included in a second region based on a combined weight that is below a threshold value. In some embodiments, node 6 412-node 10 420 include an aggregated number of instructions that is below a threshold number. The application modifier 122 can insert commit instructions in the modified control flow graph 300B before node 6 314 and following node 6 314, node 8 318, node 9 320, and node 10 322.

The control flow graph 300B and dominator tree 400 of FIG. 4 are not intended to indicate that there are a particular number of nodes, arcs, or commit instructions to be included. Rather, the control flow graph 300B and the dominator tree 400 can include any suitable number of nodes, arc, and commit instructions, among others.

Figure 5:
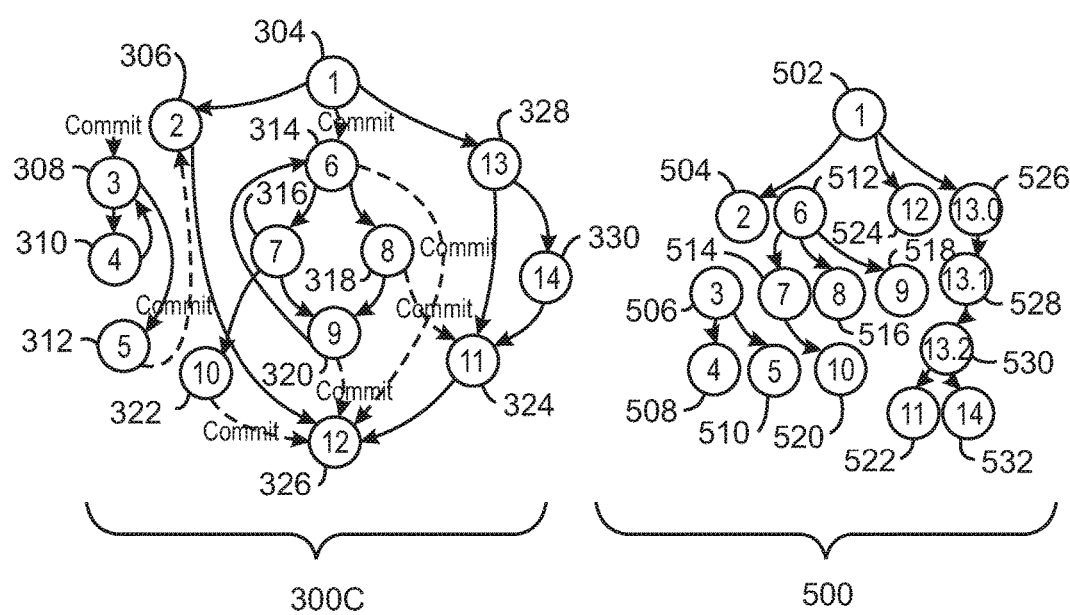
FIG. 5 is an example block diagram for updating a dominator tree.

FIG. 5 is an example block diagram for updating the dominator tree. The control flow graph 300C and the dominator tree 302 can be updated by any suitable computing device such as the computing device 100 of FIG. 1. In some examples, the control flow graph 300C is updated to include additional commit instructions.

In some embodiments, the dominator tree modifier 120 can update the third iteration of the dominator tree 500 after a region is identified. For example, arcs that include commit instructions between nodes may not be considered as relevant control flow arc. Accordingly, the dominator tree modifier 120 can exclude previously identified regions from the dominator tree 500 and update the dominator tree 500 based on the exclusion. For example, in FIG. 5, the new dominator tree 500 no longer includes the region with node 3 506, node 4 508, and node 5 510 or the region with node 6 512-node 10 520.

In some embodiments, the dominator tree modifier 120 can detect that a node includes a function call. For example, the dominator tree modifier 120 can detect that, in the dominator tree 500 of FIG. 5, node 13 328 includes a function call. To handle function calls, the dominator tree modifier 120 processes functions in the reverse topological order in a program's call graph (i.e. in a bottom up technique). Accordingly, when a function is being processed for region formation, the function's callees have already been partitioned. If the callee function's overall cost is less than a threshold value, then the call can be treated as a single statement. Otherwise, if the cost of the callee function is greater than the threshold value and the callee function has gone through region formation internally, the basic block containing the function call can be split into three nodes. For example, the dominator tree modifier 120 can split a node with a function call into a node with instructions before the function call, the function call itself, and instructions following the function call. The example dominator tree 500C illustrates node 13 328 being split into nodes 13.0 526, 13.1 528, and 13.2 530.

In some examples, node 13.1 528 reflects the cost of the function call itself plus the cost of any basic blocks or nodes that were part of any small region at the beginning of the callee function. In one example, any small region formed, such as from basic blocks close to the root of the callee's dominator tree, can be annexed to the region formed around the caller function's node or basic block. Similarly, small regions formed at the end of the callee's function can be annexed to a node for instructions following a function call. In some embodiments, if small regions exist, their corresponding cost can be incorporated into the node succeeding the call node, such as node 13.2 530 in dominator tree 500. Additionally, the dominator tree modifier 120 can insert a commit instruction on the arcs going from the call node 13.1 528 to node 13.2 530 to reflect the last commit instruction points within the callee. The dominator tree modifier 120 can thus enable more uniform regions and avoid unnecessary fragmentation.

In some embodiments, with respect to recursive function calls, when the target of a call statement is a function within a strongly connected component (SCC) in the call graph, commit instructions can be inserted before and after a call to such functions. In some examples, function pointers can be treated in a similar way.

Also, as shown in the dominator tree 500, after commit instructions are inserted on incoming and outgoing arcs to and from the region with nodes 6-10 512-520, the updated dominator tree 500 has node 11 522 placed under node 13.2 530 instead of node 1 502. The dominator tree modifier 120 includes node 11 522 as a child node for node 13.2 530 because the control path to get to node 11 522 without passing through a commit instruction is via node 13.2 530 indicated in the updated dominator tree 500.

The control flow graph 300C and dominator tree 500 of FIG. 5 are not intended to indicate that there are a particular number of nodes, arcs, or commit instructions to be included. Rather, the control flow graph 300C and the dominator tree 500 can include any suitable number of nodes, arc, and commit instructions, among others.

Figure 6:
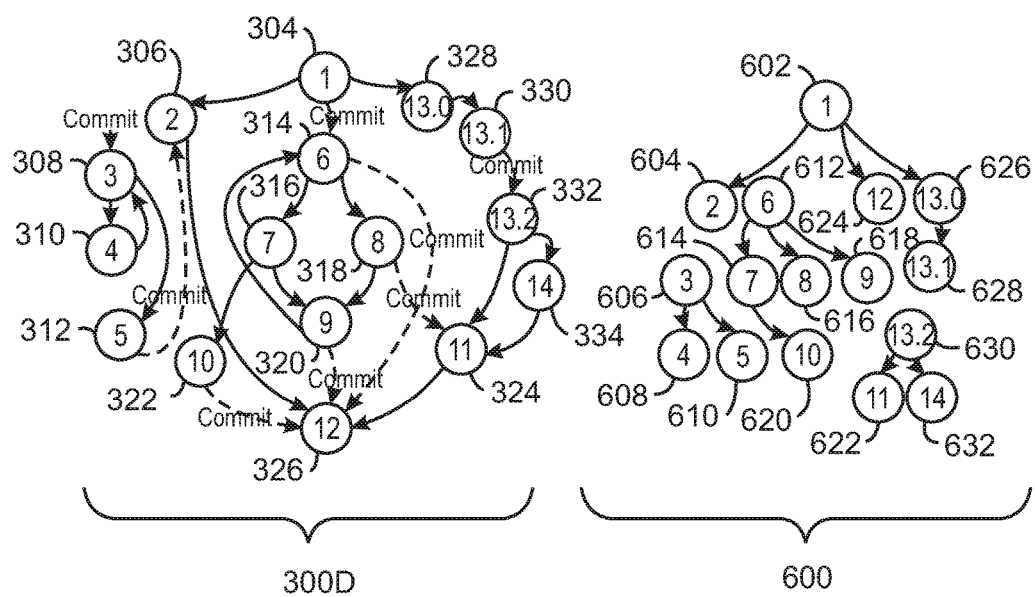
FIG. 6 is an example block diagram illustrating a modified control flow graph and a dominator tree separated into various regions.

FIG. 6 is an example block diagram illustrating a modified control flow graph and a dominator tree separated into various regions. For example, dominator tree 600 of FIG. 6 excludes node 13.2 630, node 11 622 and node 14 632 as the previously identified region from FIG. 5. Accordingly, the application modifier 122 can insert commit instructions before node 13.2 332 of the control flow graph and following node 11 324 of the control flow graph. Furthermore, the dominator tree modifier 120 can determine that the remaining nodes of the dominator tree 600 have an aggregate cost or weight below a threshold value. Thus, the dominator tree modifier 120 can determine that node 1 602, node 2 604, node 12 624, node 13.0 626, and node 13.1 628 are the last identified region of the dominator tree. Accordingly, there are no additional commit instructions to insert into the control flow graph. In some examples, the dominator tree modifier 120 can generate a termination indicator in response to detecting that there are not any additional regions to be identified or selected from a dominator tree.

The control flow graph 300D and dominator tree 600 of FIG. 6 are not intended to indicate that there are a particular number of nodes, arcs, or commit instructions to be included. Rather, the control flow graph 300D and the dominator tree 600 can include any suitable number of nodes, arc, and commit instructions, among others.

Figure 7:
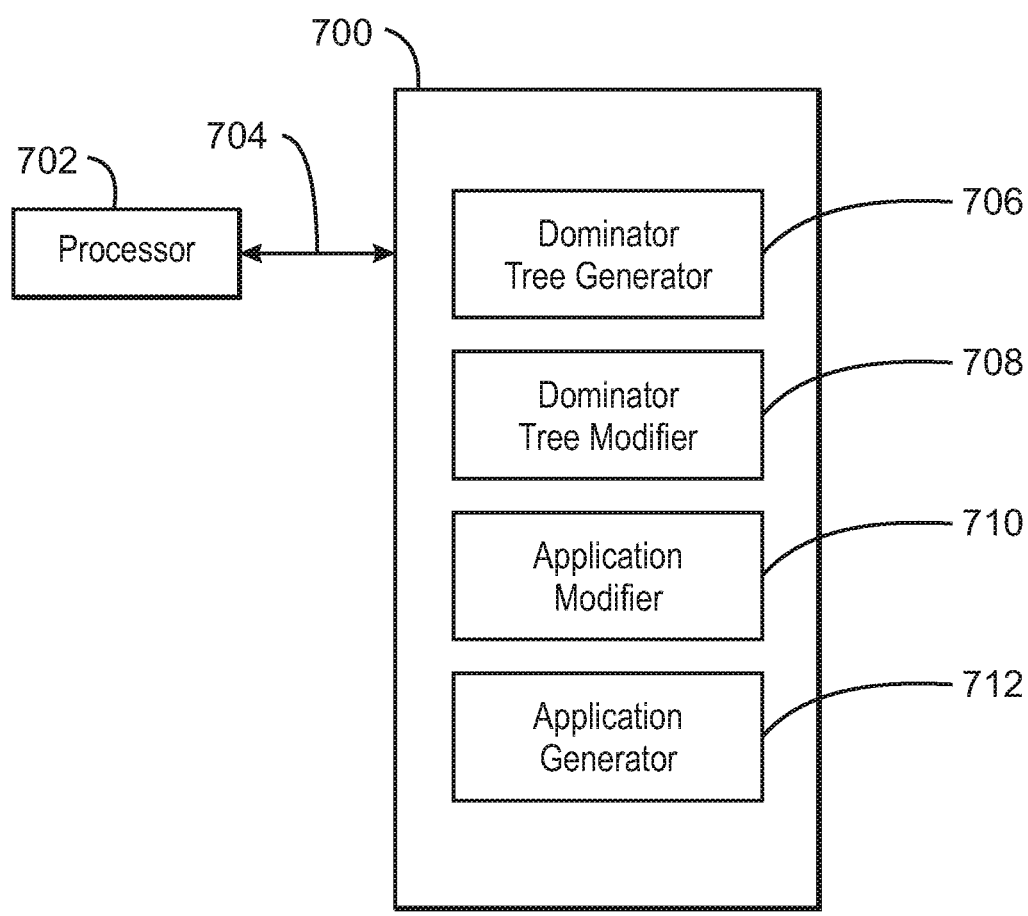
FIG. 7 illustrates a block diagram of a non-transitory computer readable media for modifying applications to support incremental checkpoints.

FIG. 7 illustrates a block diagram of a non-transitory computer readable media for modifying applications to support incremental checkpoints. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the current method.

The various software components discussed herein may be stored on the tangible, non-transitory, computer-readable medium 700, as indicated in FIG. 7. For example, a dominator tree generator 706 can generate a dominator tree based on a control flow graph for source code, wherein the control flow graph and the dominator tree comprise a plurality of nodes corresponding to basic blocks of the source code. In some embodiments, a dominator tree modifier 708 can select a region based on a leaf node of the dominator tree, wherein the region is based on an instruction threshold.

In some embodiments, an application modifier 710 can insert a first set of commit instructions into the source code based on entry points into the region and insert a second set of commit instructions into the source code based on exit points from the region. In some embodiments, the dominator tree modifier 708 can update the dominator tree to exclude the selected region. Additionally, in some embodiments, an application generator 712 can compile the source code into an executable application, wherein the first set of commit instructions and the second set of commit instructions enable incremental checkpoints.

It is to be understood that any suitable number of the software components shown in FIG. 7 may be included within the tangible, non-transitory computer-readable medium 700. Furthermore, any number of additional software components not shown in FIG. 7 may be included within the tangible, non-transitory, computer-readable medium 700, depending on the specific application.

EXAMPLE 1

In some examples, a system for modifying applications comprises logic to generate a dominator tree based on a control flow graph for source code, wherein the control flow graph and the dominator tree comprise a plurality of nodes corresponding to basic blocks of the source code. The logic can also select a region based on a leaf node of the dominator tree, the region based on an instruction threshold. Additionally, the logic can insert a first set of commit instructions into the source code based on entry points into the region and insert a second set of commit instructions into the source code based on exit points from the region. Furthermore, the logic can update the dominator tree to exclude the selected region and compile the source code into an executable application, wherein the first set of commit instructions and the second set of commit instructions enable incremental checkpoints.

Alternatively, or in addition, the instruction threshold can indicate a maximum number of instructions per region. Alternatively, or in addition, each of the basic blocks can include one entry point and one exit point. Alternatively, or in addition, the logic can determine that the dominator tree comprises a number of nodes that exceeds the instruction threshold after updating the dominator tree to exclude the selected region and select a second region based on a second leaf node of the updated dominator tree. Alternatively, or in addition, the logic can detect that the leaf node in the dominator tree comprises a function call and split the leaf node into three nodes corresponding to the function call, instructions prior to the function call, and instructions following the function call. Alternatively, or in addition, the leaf node can correspond to a deepest node in the dominator tree that is not assigned to a previously selected region. Alternatively, or in addition, the logic can select the region by determining that the leaf node, a parent node, and a plurality of child nodes of the parent node have a combined weight below the instruction threshold. Alternatively, or in addition, the combined weight of the leaf node, the parent node, and the plurality of child nodes of the parent node can be an aggregated instruction count. Alternatively, or in addition, the first set of commit instructions and the second set of commit instructions can store a current state of the executable application during runtime. Alternatively, or in addition, the logic can determine that the second region is below the instruction threshold and generate a termination indicator to indicate that the dominator tree has been separated into a maximum number of regions.

EXAMPLE 2

In some examples, a method for modifying applications includes generating a dominator tree based on a control flow graph for source code, wherein the control flow graph and the dominator tree comprise a plurality of nodes corresponding to basic blocks of the source code. The method can also include selecting a region based on a leaf node of the dominator tree, the region based on an instruction threshold. The method can also include inserting a first set of commit instructions into the source code based on entry points into the region and inserting a second set of commit instructions into the source code based on exit points from the region. Furthermore, the method can include updating the dominator tree to exclude the selected region and compiling the source code into an executable application, wherein the first commit instruction and the second commit instruction enable incremental checkpoints.

Alternatively, or in addition, the instruction threshold can indicate a maximum number of instructions per region. Alternatively, or in addition, each of the basic blocks can include one entry point and one exit point. Alternatively, or in addition, the method can include determining that the dominator tree comprises a number of nodes that exceeds the instruction threshold after updating the dominator tree to exclude the selected region and selecting a second region based on a second leaf node of the updated dominator tree. Alternatively, or in addition, the method can include detecting that the leaf node in the dominator tree comprises a function call and split the leaf node into three nodes corresponding to the function call, instructions prior to the function call, and instructions following the function call. Alternatively, or in addition, the leaf node can correspond to a deepest node in the dominator tree that is not assigned to a previously selected region. Alternatively, or in addition, the method can include selecting the region by determining that the leaf node, a parent node, and a plurality of child nodes of the parent node have a combined weight below the instruction threshold. Alternatively, or in addition, the combined weight of the leaf node, the parent node, and the plurality of child nodes of the parent node can be an aggregated instruction count. Alternatively, or in addition, the first set of commit instructions and the second set of commit instructions can store a current state of the executable application during runtime. Alternatively, or in addition, the method can include determining that the second region is below the instruction threshold and generate a termination indicator to indicate that the dominator tree has been separated into a maximum number of regions.

EXAMPLE 3

In some examples, a tangible, non-transitory computer readable media for modifying applications can include a plurality of instructions that in response to being executed by a processor, cause the processor to generate a dominator tree based on a control flow graph for source code, wherein the control flow graph and the dominator tree comprise a plurality of nodes corresponding to basic blocks of the source code. The plurality of instructions can also cause the processor to select a region based on a leaf node of the dominator tree, the region based on an instruction threshold. Additionally, the plurality of instructions can also cause the processor to insert a first set of commit instructions into the source code based on entry points into the region and insert a second set of commit instructions into the source code based on exit points from the region. Furthermore, the plurality of instructions can also cause the processor to update the dominator tree to exclude the selected region and compile the source code into an executable application, wherein the first set of commit instructions and the second set of commit instructions enable incremental checkpoints.

Alternatively, or in addition, the instruction threshold can indicate a maximum number of instructions per region. Alternatively, or in addition, each of the basic blocks can include one entry point and one exit point. Alternatively, or in addition, the plurality of instructions can also cause the processor to determine that the dominator tree comprises a number of nodes that exceeds the instruction threshold after updating the dominator tree to exclude the selected region and select a second region based on a second leaf node of the updated dominator tree. Alternatively, or in addition, the plurality of instructions can also cause the processor to detect that the leaf node in the dominator tree comprises a function call and split the leaf node into three nodes corresponding to the function call, instructions prior to the function call, and instructions following the function call. Alternatively, or in addition, the leaf node can correspond to a deepest node in the dominator tree that is not assigned to a previously selected region. Alternatively, or in addition, the plurality of instructions can also cause the processor to select the region by determining that the leaf node, a parent node, and a plurality of child nodes of the parent node have a combined weight below the instruction threshold. Alternatively, or in addition, the combined weight of the leaf node, the parent node, and the plurality of child nodes of the parent node can be an aggregated instruction count. Alternatively, or in addition, the first set of commit instructions and the second set of commit instructions can store a current state of the executable application during runtime. Alternatively, or in addition, the plurality of instructions can also cause the processor to determine that the second region is below the instruction threshold and generate a termination indicator to indicate that the dominator tree has been separated into a maximum number of regions.

Although an example embodiment of the disclosed subject matter is described with reference to block and flow diagrams in FIGS. 1-7, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A system for modifying applications comprising: logic to:
    generate a dominator tree based on a control flow graph for source code, wherein the control flow graph and the dominator tree comprise a plurality of nodes corresponding to basic blocks of the source code;
    select a region based on a leaf node of the dominator tree, the region based on an instruction threshold, wherein the instruction threshold indicates a maximum number of instructions per region;
    insert a first set of commit instructions into the source code to save a first state based on entry points into the region;
    insert a second set of commit instructions into the source code to save a second state based on exit points from the region;
    update the dominator tree to exclude the selected region; and
    compile the source code into an executable application, wherein the first set of commit instructions and the second set of commit instructions enable incremental checkpoints.

2. The system of claim 1, wherein each of the basic blocks comprise one entry point and one exit point.

3. The system of claim 1, wherein the logic is to:
    determine that the dominator tree comprises a number of nodes that exceeds the instruction threshold after updating the dominator tree to exclude the selected region; and
    select a second region based on a second leaf node of the updated dominator tree.

4. The system of claim 3, wherein the logic is to:
    determine that the second region is below the instruction threshold; and
    generate a termination indicator to indicate that the dominator tree has been separated into a maximum number of regions.

5. The system of claim 1, wherein the logic is to:
    detect that the leaf node in the dominator tree comprises a function call; and
    split the leaf node into three nodes corresponding to the function call, instructions prior to the function call, and instructions following the function call.

6. The system of claim 1, wherein the leaf node corresponds to a deepest node in the dominator tree that is not assigned to a previously selected region.

7. The system of claim 1, wherein the logic is to select the region by determining that the leaf node, a parent node, and a plurality of child nodes of the parent node have a combined weight below the instruction threshold.

8. The system of claim 7, wherein the combined weight of the leaf node, the parent node, and the plurality of child nodes of the parent node comprises an aggregated instruction count.

9. A method for modifying applications comprising:
    generating a dominator tree based on a control flow graph for source code, wherein the control flow graph and the dominator tree comprise a plurality of nodes corresponding to basic blocks of the source code;
    selecting a region based on a leaf node of the dominator tree, the region based on an instruction threshold, wherein the instruction threshold indicates a maximum number of instructions per region;
    inserting a first set of commit instructions into the source code to save a first state based on entry points into the region;
    inserting a second set of commit instructions into the source code to save a second state based on exit points from the region;
    updating the dominator tree to exclude the selected region; and
    compiling the source code into an executable application, wherein the first commit instruction and the second commit instruction enable incremental checkpoints.

10. The method of claim 9, wherein each of the basic blocks comprise one entry point and one exit point.

11. The method of claim 9, comprising:
    determining that the dominator tree comprises a number of nodes that exceeds the instruction threshold after updating the dominator tree to exclude the selected region; and
    selecting a second region based on a second leaf node of the updated dominator tree.

12. The method of claim 9, comprising:
    detecting that the leaf node in the dominator tree comprises a function call; and
    splitting the leaf node into three nodes corresponding to the function call, instructions prior to the function call, and instructions following the function call.

13. The method of claim 9, wherein the leaf node corresponds to a deepest node in the dominator tree that is not assigned to a previously selected region.

14. The method of claim 9, comprising selecting the region by determining that the leaf node, a parent node, and a plurality of child nodes of the parent node have a combined weight below the instruction threshold.

15. The method of claim 14, wherein the combined weight of the leaf node, the parent node, and the plurality of child nodes of the parent node comprises an aggregated loop count.

16. A tangible, non-transitory computer readable media for modifying applications comprising a plurality of instructions that in response to being executed by a processor, cause the processor to:
    generate a dominator tree based on a control flow graph for source code, wherein the control flow graph and the dominator tree comprise a plurality of nodes corresponding to basic blocks of the source code;
    select a region based on a leaf node of the dominator tree, the region based on an instruction threshold;
    insert a first set of commit instructions into the source code to save a first state comprising heap information based on entry points into the region;
    insert a second set of commit instructions into the source code to save a second state comprising heap information based on exit points from the region;
    update the dominator tree to exclude the selected region; and
    compile the source code into an executable application, wherein the first set of commit instructions and the second set of commit instructions enable incremental checkpoints.

17. The tangible, non-transitory computer-readable media of claim 16, wherein the plurality of instructions cause the processor to
    determine that the dominator tree comprises a number of nodes that exceeds the instruction threshold after updating the dominator tree to exclude the selected region; and
    select a second region based on a second leaf node of the updated dominator tree.

18. The tangible, non-transitory computer-readable media of claim 16, wherein the plurality of instructions cause the processor to:
  detect that the leaf node in the dominator tree comprises a function call; and
  split the leaf node into three nodes corresponding to the function call, instructions prior to the function call, and instructions following the function call.

* * * * *